Sept. 30, 1941.   C. R. NELSON   2,257,185
TRACTION DEVICE FOR VEHICLE WHEELS
Filed June 9, 1941
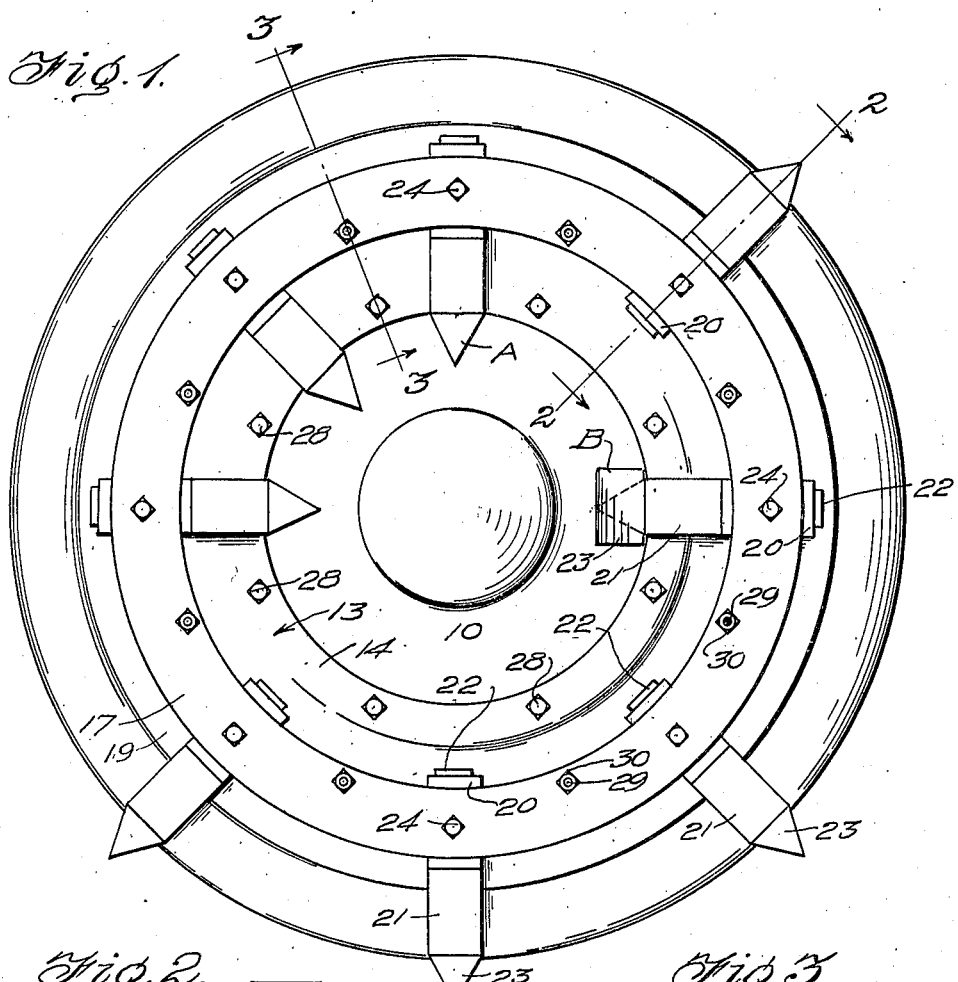
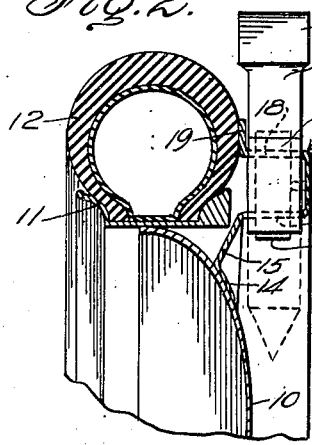
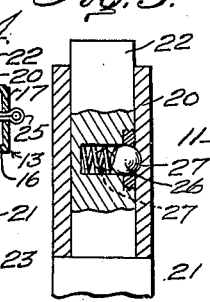 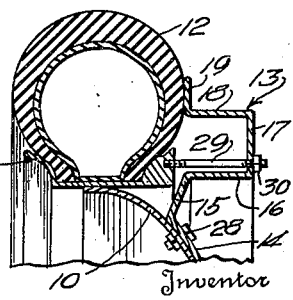
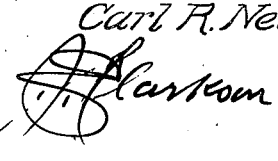
Inventor
Carl R. Nelson, Patented Sept. 30, 1941

2,257,185

UNITED STATES PATENT OFFICE 2,257,185

TRACTION DEVICE FOR VEHICLE WHEELS

Carl R. Nelson, Dysart, Iowa

Application June 9, 1941, Serial No. 397,313

5 Claims. (Cl. 301—50)

This invention relates to traction devices for the wheels of motor vehicles and has special reference to a reversible lug attachment for such wheels. More particularly the invention is applicable to wheels with pneumatic tires.

One important object of the invention is to provide a device of this character wherein reversible traction lugs, when in position for use, will be supported in such position against movement inwardly of the wheel and a novel and effective manner without the use of bolts or clamps.

A second important object of the invention is to provide a novel device of the kind wherein the various elements are of simple character but are arranged to effectively resist bending or breaking of the parts.

A third important object of the invention is to provide a novel device of this character which may be constructed for application to any existing tractor wheel.

With the above and other objects in view, as will presently be apparent, the invention consists in general of certain novel details of construction and combinations of parts hereinafter fully described, illustrated in the accompanying drawing and pointed out in the appended claims.

In the accompanying drawing like characters of reference indicate like parts in the several views, and—

Figure 1 is a face view of a disk wheel having the invention applied thereto, certain of the lugs being shown in tractive position and the remainder in position for storage or non-use.

Figure 2 is a section on the line 2—2 of Figure 1.

Figure 3 is a fragmentary section on the line 3—3 of Figure 1.

Figure 4 is a fragmentary section showing a part of Figure 2 slightly modified.

Figure 5 is an enlarged fragmentary section of part of Figure 4 but with a further modification.

In the embodiment of the invention as here shown the device has been illustrated as applied to a disk wheel having a central disk portion 10 and a rim 11 carrying the usual pneumatic tire 12.

The attachment itself includes an annular member indicated in general at 13 and this annular member includes an inner portion 14 shaped to fit against the central portion 10. While this portion 13 is here shown of a shape to fit one particular shape of disk wheel it is obvious that its shape may be varied to fit other disk wheels or to fit against a plate secured to a spoked wheel. Extending angularly outward from the portion 14 is a portion 15 and from the outer edge of the portion 15 extends a portion 16 forming a hollow cylindrical part concentric to the axis of the wheel. Extending outwardly at right angles from the portion 16 is a portion 17 and a second cylindrical portion 18 from which extends an outer flange 19 preferably engaging against the side wall of the tire 12. The portions 16, 17 and 18 thus form an annular channel facing or opening towards the outer part of the wheel and the portions 14 and 15 form what may be termed an inner securing flange or lip while the portion 19 forms an outer supporting lip.

The portions 16 and 18 are each provided with a series of circumferentially spaced holes, the holes being preferably square and the holes in the portion 16 being radially alined with those in the portion 18. These holes are thus arranged in radial pairs and fitted in each pair of holes is a square sleeve 20. These sleeves are welded or otherwise permanently secured in place in the member 13. For each of the sleeves there is provided a traction lug and each of these lugs comprises a square prismatic body 21, a square prismatic stem 22 and a wedge shaped point 23. The body 21, stem 22, and point 23 are integral and form a single element. The body 21 has the same cross-section as the external dimensions of the sleeve 20 and the stem has substantially the same cross-sectional dimensions as the opening in the sleeve, the stem and body providing a square shoulder which, when the stem is inserted in the sleeve, will bear against a square end of said sleeve. As shown in Figures 1 and 2 a set screw 24 extends through the portion 17 and sleeve 20 to bear against the stem 22 to prevent accidental release of a lug from its sleeve. It is to be understood that this set screw does not carry any of the pressure exerted on the lug when in use, this pressure being taken entirely by the shoulder of the lug as it bears against the sleeve end.

In place of the set screw 24 a cotter pin 25 may be used as shown in Figure 4 or as shown in Figure 5 a spring pressed ball 26 may be carried by the stem to fit into notch 27 formed in two adjacent walls of the sleeve.

The whole device is held in place removably by bolts 28, which pass through the portion 14 and the wheel disk 10, and by bolts 29 which are screwed into the rim 11 and pass through suitable openings in the portion 17 and nuts 30 are secured on the projecting ends of these bolts.

In use the lugs have their stems inserted in the sleeves from the outer ends thereof, while when the lugs are not to be used their stems are inserted from the inner ends of said sleeves. In any case the lugs are held by the fastening means such as the set screw 24, the cotter 25 or the ball 26. It will be noted that the point 23 is wider in one direction than the body 21. By reason of the shank 22 being square in cross-section it may be stored, if desired, in either the position shown at A in Figure 1 or as at B in that figure, the latter position being preferable if the wheel construction is such that the disk interferes with placing the points as at A.

There has thus been provided a simple and efficient device of the kind described and for the purpose specified.

It is obvious that changes may be made in the form and construction of the invention without departing from the material inventive principles. It is not therefore desired to confine the invention to the exact form here shown and described but it is desired to include all such as properly come within the scope claimed.

What is claimed is:

1. In a traction lug device for wheels having a center, a rim and a tire, an annular channel member adapted to face the rim portion of the wheel, an inner lip adapted to be secured to the center of the wheel and an outer lip adapted to fit against the tire, sleeves of square cross-section extending radially through the channel member and having squared ends, lugs each having a square stem fitting in a sleeve from a selected end and having a body forming a squared shoulder with said stem and adapted to fit against the sleeve end into which the stem is inserted, means to hold the stems releasably in the sleeve, fastening means extending through the inner lip to secure the lip to the wheel center, and other fastening means for securing the channel member to the wheel rim.

2. In a traction lug device for wheels having a center, a rim and a tire, an annular channel member adapted to face the rim portion of the wheel, an inner lip adapted to be secured to the center of the wheel and an outer lip adapted to fit against the tire, sleeves of square cross-section extending radially through the channel member and having squared ends, lugs each having a square stem fitting in a sleeve from a selected end and having a body forming a square shoulder with said stem and adapted to fit against the sleeve end into which the stem is inserted, means to hold the stems releasably in the sleeves and means to secure the channel member in place on the wheel.

3. In a traction lug device for wheels having a center, a rim and a tire, an annular channel member adapted to face the rim portion of the wheel, an inner lip adapted to be secured to the center of the wheel and an outer lip adapted to fit against the tire, sleeves of polygonal cross-section extending radially through the channel member and having equare ends, lugs each having a polygonal stem fitting in a sleeve from a selected end and having a body forming a square shoulder with said stem and adapted to fit against the sleeve end into which the stem is inserted, means to hold the stems releasably in the sleeves and means to secure the channel member in place on the wheel.

4. In a traction lug device for wheels, an annular channel member adapted to face the rim portion of a wheel, sleeves of square cross-section extending radially through the channel member and having squared ends, lugs each having a square stem fitting in a sleeve from a selected end and having a body forming a squared shoulder with said stem and adapted to fit against the sleeve end into which the stem is inserted, means to hold the stems releasably in the sleeves, and means to secure the channel member in place on the wheel.

5. In a traction lug device for wheels, an annular channel member adapted to face the rim portion of a wheel, sleeves of internal polygonal cross-section extending radially through the channel member and having squared ends, lugs each having a polygonal stem fitting in a sleeve from a selected end and having a body forming a squared shoulder with said stem and adapted to fit against the sleeve ends into which the stem is inserted, means to hold the stems releasably in the sleeves, and means to secure the channel member in place on a wheel.

CARL R. NELSON.